No. 726,508. PATENTED APR. 28, 1903.
P. P. COLER.
MACHINE FOR HARVESTING CORN.
APPLICATION FILED AUG. 21, 1896.
NO MODEL. 8 SHEETS—SHEET 1.

Fig. 2

No. 726,508. PATENTED APR. 28, 1903.
P. P. COLER.
MACHINE FOR HARVESTING CORN.
APPLICATION FILED AUG. 21, 1896.
NO MODEL. 8 SHEETS—SHEET 6.

Fig. 6

WITNESSES: John M. Culver, E. E. Clinton.

INVENTOR Peter P. Coler
BY R. B. Swift. ATTORNEY.

No. 726,508. PATENTED APR. 28, 1903.
P. P. COLER.
MACHINE FOR HARVESTING CORN.
APPLICATION FILED AUG. 21, 1896.
NO MODEL. 8 SHEETS—SHEET 8.

WITNESSES:
J. M. Culver.
Ralph W. Hart.

INVENTOR
Peter P. Coler.
BY R. B. Swift.
ATTORNEY.

UNITED STATES PATENT OFFICE.

PETER P. COLER, OF CHICAGO, ILLINOIS, ASSIGNOR TO McCORMICK HARVESTING MACHINE COMPANY.

MACHINE FOR HARVESTING CORN.

SPECIFICATION forming part of Letters Patent No. 726,508, dated April 28, 1903.

Application filed August 21, 1896. Serial No. 603,469. (No model.)

*To all whom it may concern:*

Be it known that I, PETER P. COLER, a citizen of the United States, residing at Chicago, in the county of Cook and State of Illinois, have invented a new and useful Machine for Harvesting Corn, of which the following is a specification.

My invention relates to improvements in corn self-binding harvesters of the Peck type, in which the corn is gathered between forwardly-projecting arms, one on either side of the row, with carrying devices thereon to lift and straighten the stalks and move them back between these prongs to a knife that severs them, and the stalks still remaining on end are continued rearwardly into the reach of a binding mechanism that gathers them into bundles and binds and discharges them. In machines of this type with a vertical binder having a U-shaped frame to rigidly support the needle and trip shafts upon one side of the bundle and the knotter and discharge shaft upon the other side it has been found difficult to adjust the band upon the bundle so as to centrally bind the varying lengths of corn. Numerous plans have been proposed for the placing of the bands centrally upon the bundle; but they have proven impractical when put to work in the field. One idea has been to increase the height of the needle and knotting mechanisms from the floor of the binder, and when shorter corn was to be harvested to place a supplemental floor in the machine, and thus raise the corn higher in the machine. The same idea is carried out by raising the floor of the binder. It is noticeable that the binding mechanism in the machines of the Peck type is positioned almost behind the knife and removed but a short distance from it and that there is a receptacle between the binder and the end of the carrying devices on the forwardly-projecting arms. This short distance makes the approach to the floor of the binder, if it is raised to any extent, very steep, and the corn cannot be forced up the incline. Other ideas have been to adjust the needle and the knotter on their shafts, which constructions have been found cumbersome and complicated, as the U-frame of the binder must be made very stiff and the shafting very heavy in order to stand the strain of binding very long corn.

The objects of my improvements are to provide a binding mechanism that can be adjusted vertically, so as to place the band centrally about the bundles, which mechanism is bodily adjustable, and to so attach this mechanism to the frame of the machine and to the forwardly-projecting gathering-arms that these arms will be raised to guide tall corn whenever the binder is adjusted for it.

It is also the object of my improvement to so position this binding mechanism upon the machine as to be able to adjust it as the machine moves in the field through the varying heights of corn.

Another object is to make the discharge of the bundle from the binder with less power.

A further object is to provide an improved form of clutching mechanism by which the machine can be unclutched from its driving-wheel while the machine is in motion.

I attain these objects by the mechanisms illustrated in the accompanying drawings, in which—

Similar letters refer to similar parts throughout the several views.

The frame of the machine is supported upon the main driving-wheel A and grain-wheel A' and is drawn through the field by a team attached to the tongue B. The frame consists of a heavy bent sill C upon the outside of the main wheel that extends forward for the attachment of the tongue and is bent around the wheel to the rear. A longitudinal sill C' connects the rear of the sill C with a cross-sill $C^2$, that extends from the front end of the main sill C to the longitudinal sills $C^3$ of the outer gathering-prong. The three cross-sills $C^4$ extend from the longitudinal sill C' across the longitudinal sills $C^3$ and to the grain-wheel side of the machine, and connected to them are the longitudinal sills $C^5$ of the inner gathering-prong.

Figures 5, 7:
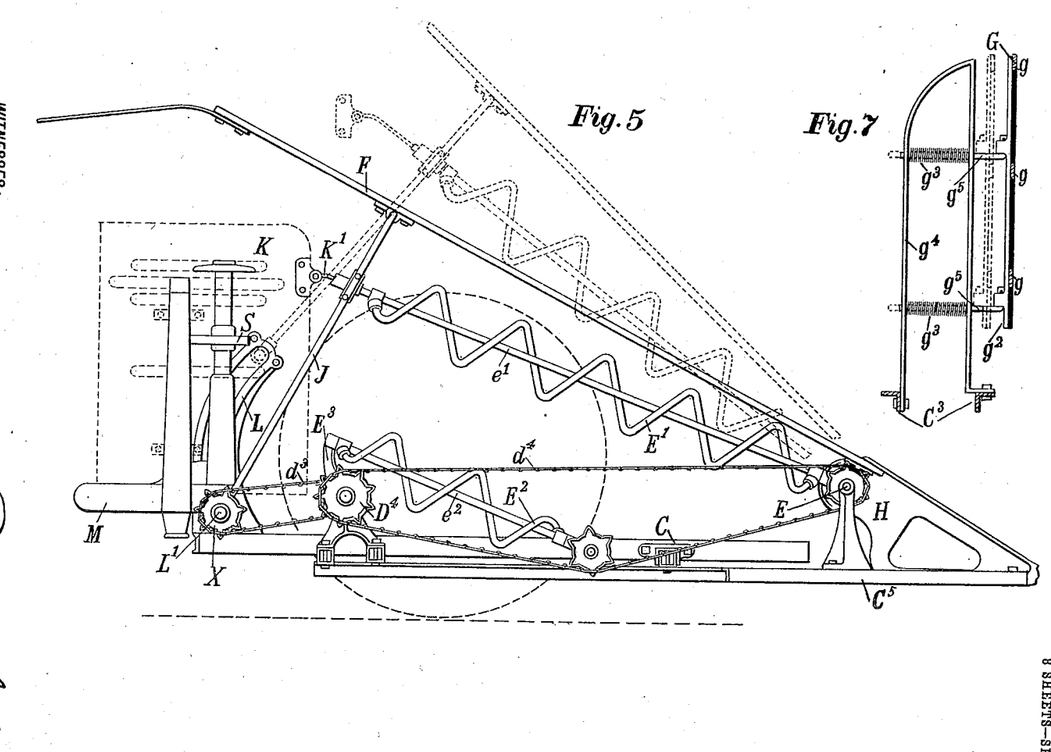
Fig. 5 is a side view from the grain side of the machine on line 5 5 of Fig. 1, and the upper dotted lines show the top and spiral in the position they occupy when the binder is adjusted for tall corn.
Fig. 7 is an end view of the spring-pressed guide on the inner gathering-arm opposite the forwarding-spirals on the outer arm.
Figure 6:
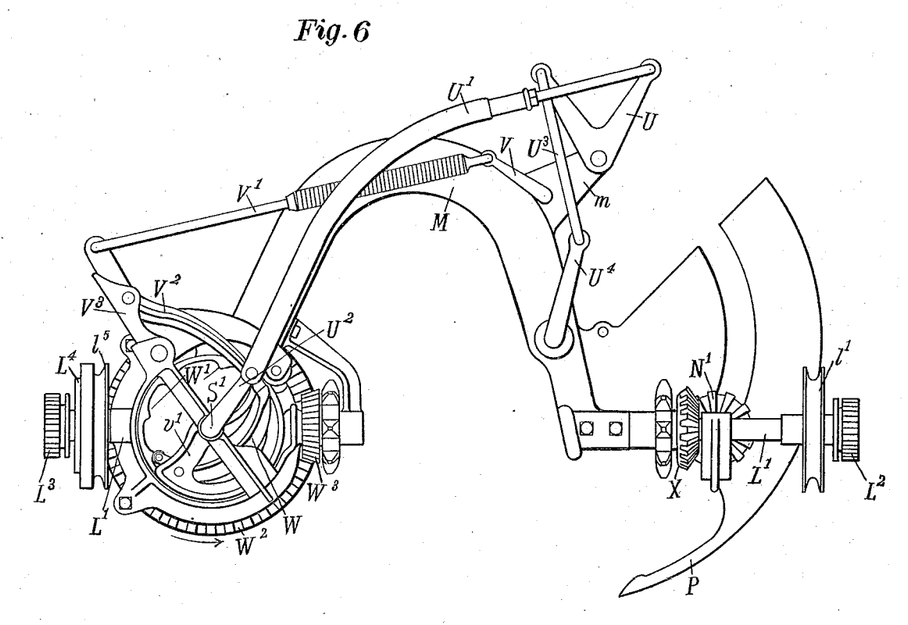
Fig. 6 is an enlarged bottom view of the binder attachment, showing the horizontal member of the U-shaped binder-frame curved outwardly toward the discharge side of the binder, also showing one arrangement of levers for vibrating the needle-shaft from the knotter-shaft. Other details of construction are also shown.

There is mounted upon the main axle $A^2$ of the machine a spur-wheel $A^3$, that is connected to the main wheel by clutching mechanism, which will be hereinafter described. This spur-wheel meshes with the spur-pinion $A^4$, that is rigidly keyed to the outer end of the main shaft $A^5$ of the machine, that is positioned in bearings on the machine-frame and extended transversely across the frame. Near the outer end of the main shaft $A^5$ is the bevel-wheel D, which gives motion to a crank that reciprocates the knife B' across the stalk passage-way to sever the stalk. The sprocket-wheel $D^2$ upon this shaft gives motion through its chain $d^2$ at one side to parts of the binding mechanism, and the sprocket-wheel $D^3$ upon the other side of the machine through its chain $d^3$ gives motion to other parts of the binding mechanism, while a sprocket-wheel $D^4$ through its chain $d^4$ gives motion to the spiral conveyers that are located upon the prong beside the standing corn. A cross-shaft E is mounted on an upright from the longitudinal sills $C^5$ and by means of gear connections rotates the spiral E', that starts near the point of the gathering-prong and continues rearwardly beyond the knife and upwardly toward the binder. A central shaft e', bolted to the gathering-prong in front and having a bearing upon the post which supports the rear end of the inclined rearwardly and upwardly slanting supplemental guide-board F, furnishes a bearing for the rear end of the spiral and a guide to the corn in the passage-way to prevent its falling too far into the coils of the spiral. A lower and shorter spiral $E^2$ is positioned below the upper spiral E', and its front end is connected to the inner of the longitudinal sills $C^5$ and is actuated by the same chain that gives motion to the upper spiral by means of a sprocket-wheel, bevel-wheel, and bevel-pinion on the lower spiral $E^2$, and its rear end is connected to a post $E^3$, upstanding from the main frame of the machine. A central shaft $e^2$ performs the same function in this spiral as the shaft e' in the upper spiral. In the construction shown in the drawings the spirals are shown upon only one side of the corn passage-way, and upon the other side a spring-pressed framework guides the corn and holds it up to the spirals. This is thought to be the preferable construction, and that the spirals up one side will be sufficient to move the corn onwardly in the passage-way. However, the spring-pressed slide can be removed and another set of spirals corresponding to the inner set and driven from the main shaft of the machine in the same way can be substituted for the spring-slide. This spring-pressed slide G is formed of bars g, that are bent at their receiving ends somewhat out of the path of the corn and connected together at the receiving ends by a cross-strap g'. The bars g are also connected by cross-straps $g^6$, one near the center and the other close to the delivery end of the bars, and a guide is thus formed. This guide is supported on posts $g^4$. These posts are formed of flat bars that start from one sill of the machine and extend vertically upward and then are bent outward and downward and attached to another of the sills $C^3$ of the machine, as shown in Fig. 7. The slide G is pivoted on arms $g^5$, that are supported in the posts $g^4$ and slide therein. There are four of these arms, two for each of the upstanding posts. Upon these arms springs $g^3$ are positioned, and they act against the collar $g^7$, that is keyed to the arms inside of one of the members of the upright posts $g^4$. The other end of the spring acts against the other members of the upright posts. It is plain that the slide G will thus be held against the stream of corn by the pressure of the springs. In the drawings, Fig. 7, the spring-pressed slide is shown pivoted to the arms $g^5$, so that if a thick flow of corn is just entering the slot the receiving end of the slide can open without cramping the delivery end.

The gear-wheel that rotates the spiral E', that starts near the point of the gathering-prong, is shielded from the corn by means of a shield H, that forms the point of the prong and extends backwardly and upwardly to the side and over the point where the spiral begins. A similar shield is located on the other prong. From this outer shield the upwardly and rearwardly extending supplemental guiding-board I is pivoted at the receiving end of the board and is continued rearwardly and upwardly, the same as the board F, one on each side of the corn passage-way, and at the rear ends of the boards are continued outwardly toward the delivery side of the binder by the supplemental guiding-rods F' I'. The rear ends of these supplemental boards are mounted upon and supported by posts J and J', that are pivoted at their lower ends to the studs from the binder-frame that support the sprockets on which the binder is adjusted vertically in the binder-supporting bridles. As the binder is adjusted vertically the posts J and J' are raised, thus raising the delivery end of the spiral and the supplemental board guides, which adjustment is made for tall corn.

In Fig. 5 the plate K, which corresponds to the binder-deck in a horizontally-arranged binder, is shown in broken lines, and to this deck is attached a telescoping rod K', that moves with the binder when it is adjusted vertically, telescoping in the central shaft $e'$ of the spiral conveyer E', and which furnishes a guide for the corn, so that it will be conducted into the binder. On the outer prong the breastplate $K^2$ of the binder is extended toward the point of the gathering-prong sufficient to form a guiding-way for the stalks.

The construction thus far explained relates more particularly to the gathering or the harvester part of the machine, which gathers the corn, severs it, and conducts it onwardly into the vertically-positioned binder at the rear of the gathering-prongs, which is positioned in relation to the forwardly-projecting prongs and the gathering devices mounted upon them similarly to the binder on the Peck machine. In the Peck machine, however, there is no means provided for changing the position of the band upon the bundle. The principal feature of this invention consists in the mounting of a vertical binder upon the machine so that it can be adjusted to place the band about corn at different distances from the butts of the corn. One way of accomplishing this is to attach the adjusting-bridles L to the harvester-frame at the rear of the machine and provide them with cog-teeth $l$.

Figures 13, 14, 15, 16, 17, 18, 19:
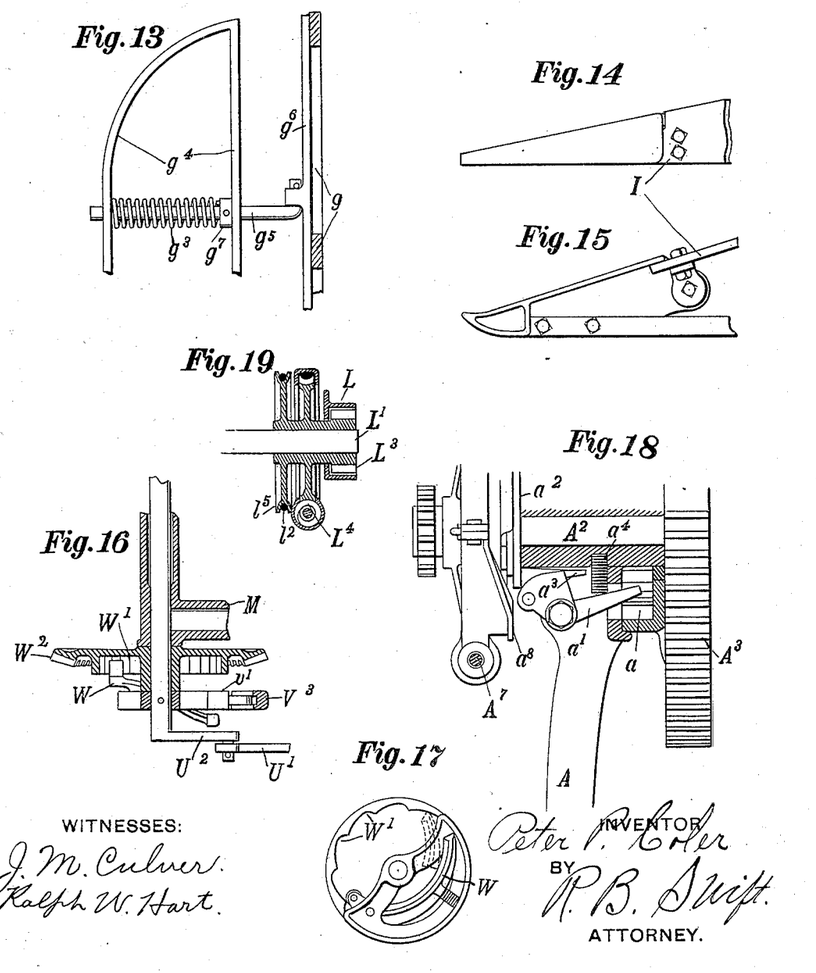
Fig. 13 is an enlarged detail of the spring-pressed corn-guide, showing more particularly the manner in which the springs hold this guide against the oncoming stream of corn.
Fig. 14 is a top view of point of gathering-prong.
Fig. 15 is an elevation showing the same parts as Fig. 14.
Fig. 16 is an enlarged detail, partly in vertical section, of the binder-frame, the bevel-wheel loosely mounted on the knotter-shaft, and the clutch mechanism which puts the binding apparatus in gear.
Fig. 17 is a plan view from the lower side of the ratchet-flange on the bevel-wheel, the fixed segment on the knotter-shaft, and the pivoted spring-pressed dog attached thereto.
Fig. 18 is an enlarged detail, partly in section, of the main-wheel hub and the dog attached thereto and the spur-wheel loosely mounted on the hub of the main wheel and of the raising device fixed to the main axle.
Fig. 19 is a detail view in section of the binder-adjusting pinion, its bridle, the screw raising device, and the flange to which the cord for the other side of the binder is fastened and on which it winds as the binder is adjusted.

From opposite sides of the binder-frame, near its bottom, studs L' are projected, upon which are mounted pinions $L^2$ $L^3$, whose teeth mesh with the teeth $l$ of the bridles. The pinion on the grain-wheel side of the machine is rigidly connected with a sheave $l'$, on the periphery of which a cord $l^2$ (preferably of wire) is wound and connected and which extends over the guiding-sheave $l^3$, attached to the frame of the machine, and thence across the machine beneath the corn passage-way to the guiding-sheave $l^4$, also attached to the frame, and thence to a sheave $l^5$, formed integral with the pinion $L^3$ and mounted with it on the outer stud L'. This sheave is connected with an adjusting device $L^4$ of the well-known screw type shown and described in the Patent of H. E. Pridmore, dated August 29, 1893, No. 504,089, which in turn is rigidly connected with the pinion $L^3$, that travels in the bridle L, as shown in Fig. 19. The raising-handle $L^5$, that turns the endless screw, extends forwardly along the inside of the main wheel of the machine, where it can be conveniently grasped by the operator. As the operator turns this handle the pinion $L^3$ and the sheave $l^5$ upon the outer stud L' are rotated and the pinion moves up the bridle. The cord $l^2$, that is connected to and wrapped about the sheave $l'$ and which is extended, as hereinafter described, across the machine, is connected to the periphery of the sheave $l^5$. When the binder is at the lowest point of adjustment, the cord is wrapped about the sheave $l'$ and connected to the periphery of the sheave $l^5$. When, however, the operator by means of the raising device turns the sheave $l^5$, together with the pinion $L^3$, the binding attachment is raised on both sides, the cord being wrapped around the sheave $l^5$ by its rotation and unwrapped from about the sheave $l'$, which it rotates, thus raising the grain-wheel side of the binder. It is lowered by reversing the raising device, and the weight of the binder is sufficient to cause the side next to the grain-wheel to drop in the bridle, thus causing the cord to wrap itself about the sheave.

Figure 4:
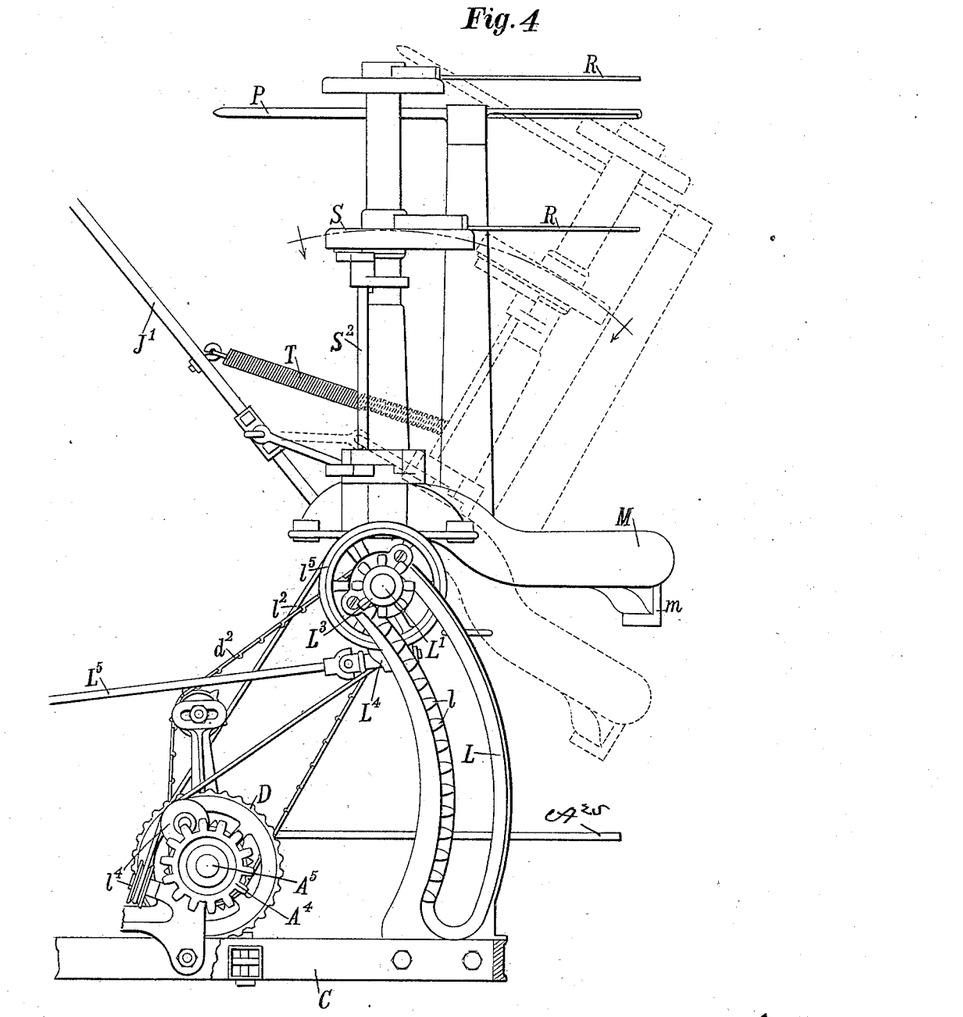
Fig. 4 is an enlarged detail of the binding mechanism from the side with its adjusting-rack and the pinion by which it is moved up and down, also showing the chain by which the power is transmitted to the knotter and needle shafts from the main shaft.

As thus far explained if the binder was of the usual construction—that is, with the lower member of the U-frame extending directly in a straight line between the vertical members, one of which supports the needle-shaft and the other the knotter-shaft—this lower horizontal member of the frame would be raised directly into the path of the oncoming corn. If the floor which covers this member was lifted, the corn would also be raised with it and the position of the band upon the bundle would not be changed. In the construction shown in the drawings the floor $A^{25}$ of the binder remains stationary and the lower horizontal member M of the binder-frame is curved rearwardly and outwardly toward the direction of the discharge of the bundle, so that when raised above the floor the bundle will be formed in the loop or curve portion of this horizontal member, the corn still resting upon the floor of the binder. When sufficient corn has accumulated to form the bundle, the corn having been received from the conveyers by packers N, which forward it stalk by stalk against tripping mechanism $v$, which in the drawings is illustrated as a device that both trips and compresses the gavel, the needle P encircles the gavel, closing the corn passage-way against the oncoming corn and presenting the cord to the knotter Q, where the knot is tied, and the ejectors R are revolved to discharge the now bound bundle from the machine. It will be plain that the bundle may or may not be formed in the loop of the binder, depending upon the height of the corn and the adjustment of the frame. It will also be plain that if the bundle has been formed in the loop M of the binder-frame this loop will form an obstruction to the discharge of the bundle and if the binder has been raised to a considerable height that it will be impossible for the ejector-arms R to tip the bundle outwardly over this curved portion of the U-frame. To get this part of the frame out of the way at the time of the discharge and to make the discharge as easy as possible—that is, to so position the binding attachment that the weight of the stalks themselves will assist in the discharge of the bundle—the binder is at the time of discharge rocked rearwardly on the studs L', which movement throws the horizontal curved arm M downwardly and inwardly on an arc of which the studs L' are the centers, as shown in dotted lines in Fig. 4, and the bundle is discharged by the ejectors R while the binding attachment is in its tilted position away from the vertical, and the bundle is thus ejected, gravity assisting, and the butts will swing out and drag over the horizontal curved portion M of the U binder-frame.

Figure 8:
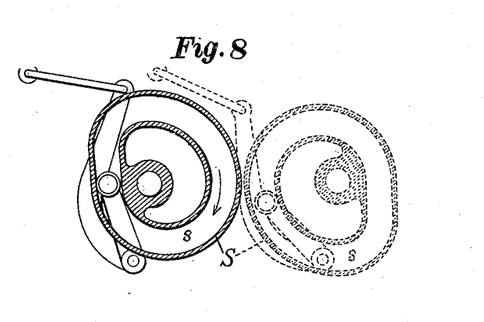
Fig. 8 is a detailed view of the cam, its lever, and connecting-rod shown in full and dotted lines, which parts tilt the binder rearwardly at the time of discharge of the bundle.
Figure 9:
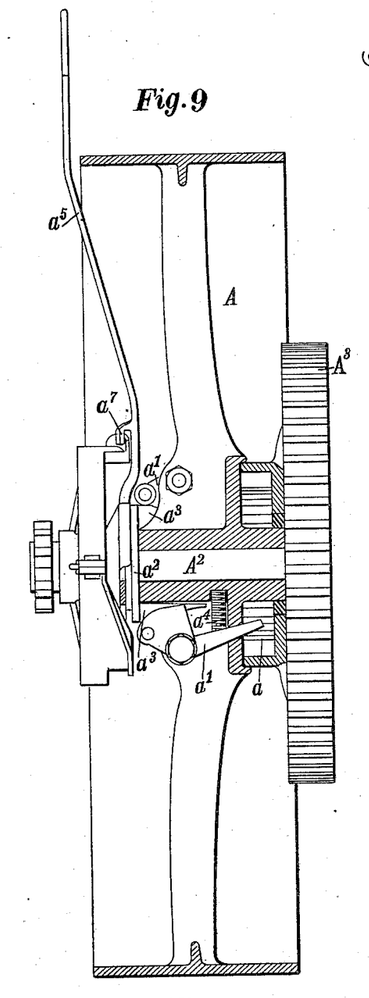
Fig. 9 is a view, partly in section, of the main wheel of the machine with my improved form of shipping mechanism attached thereto.
Figure 10:
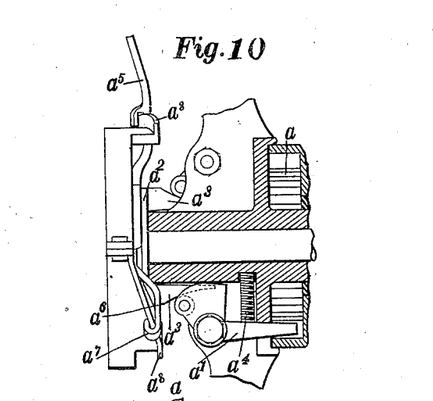
Figs. 10 and 11 are detailed views of parts of this shipping device.
Figure 11:
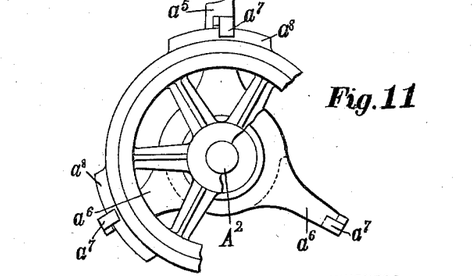
Figure 12:
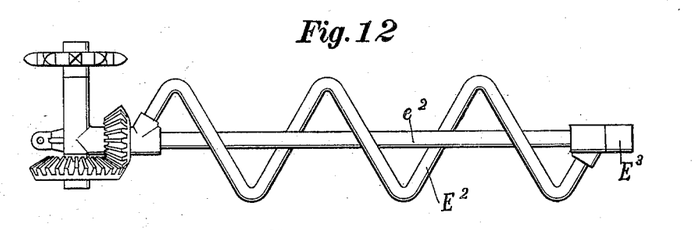
Fig. 12 is a plan view of the lower or butts-forwarding spiral, its supporting-rod, and the gearing which drives it.

A means of rocking the binder attachment is shown in the drawings and consists of a cam S, rigidly fastened to the knotter-shaft S'. This cam is shown in detail in Fig. 8, which is a view taken of line 8 8 of Fig. 4. Pivoted to the upright member of the binder-frame, that supports the knotting-shaft S', in bearings rigidly attached to this member is a rock-shaft $S^2$, the upper arm of which extends into the cam-path $s$ of the cam S. The other arm of this rock-shaft $S^2$ is connected by a link $j^4$ to the upright J', that extends from the stud that supports the binder to the supplemental board I. As the binder is adjusted vertically the post J' moves with it, and at the time when the ejectors move to discharge the bundle the binder begins its rocking motion, the cam being so formed that while the needle is encircling the bundle and the band is being tied there is but little movement, as the arm in the cam-track is then traveling so that but little motion is imparted to the rock-shaft. When, however, the bundle has been formed, the backward movement of the binder becomes more rapid, and after the bundle has been ejected a sharp bend in the cam-track toward the center quickly throws the binder into receiving position. A strong spring T, attached to the binder and to the post J', assists in the returning of the binder. In practice it has been found that the binder receives the corn in the best shape when it is in a vertical position. However, it could be tilted slightly forward or slightly rearward, the principal feature of this invention being the adjustment of the binder bodily and then the rocking it rearwardly, so that the horizontal curved member of the binder-frame is tilted downward and inward toward the butt of the bundle, that the bundle may be discharged from the machine. In practice it is found that this tipping of the binder toward a horizontal position makes the discharge of the bundle easier, as a bundle of green corn is very heavy and its weight assists in its discharge.

The curvature of the lower member M of the U-shaped binder-frame necessitates that the motion be transmitted from the knotter-shaft to the needle-shaft by other means than a straight pitman in order that the device for such transmission shall not come into the path of the butts of the corn as they are forced into the curved portion of the frame. The binding mechanism of this machine is of the Appleby type, in which the reciprocations of the needle must be in time with the movements of the knotter. This necessitates that motion be transmitted from one shaft to the other. As a means of transmitting the motion from the knotter-shaft to the needle-shaft I have pivoted to the extension $m$ from the lower horizontal member M of the U-shaped binder-frame a lever U, from one arm of which an adjustable connecting-rod U' extends to the crank $U^2$ of the knotter-shaft. The other arm of the lever U is connected to the crank $U^4$ of the needle-shaft by a connecting-rod $U^3$. By the use of the lever U, I am thus enabled to make a connection between the knotter-shaft and the needle-shaft that will give the needle its proper reciprocations and still have the parts out of the way of the butts of the corn.

Figure 1:
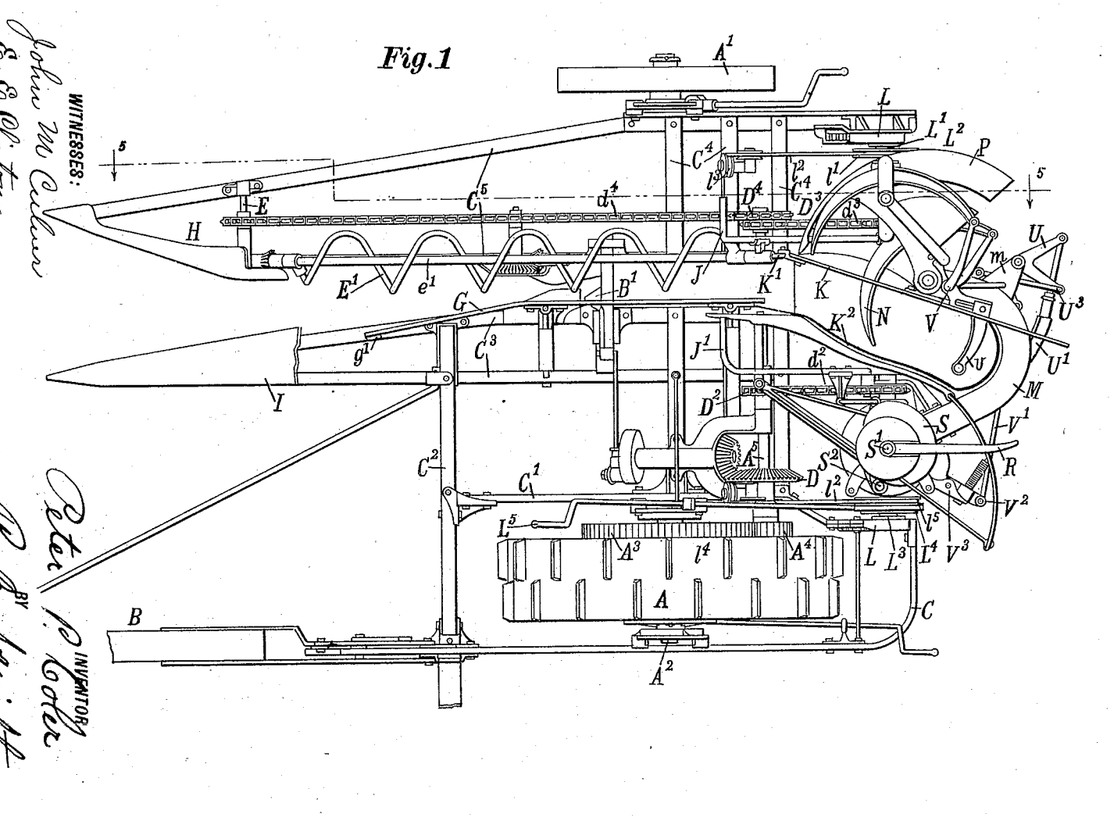
Figure 1 is a plan view of the machine, the seat being removed and the tongue and its brace being broken off.
Figure 2:
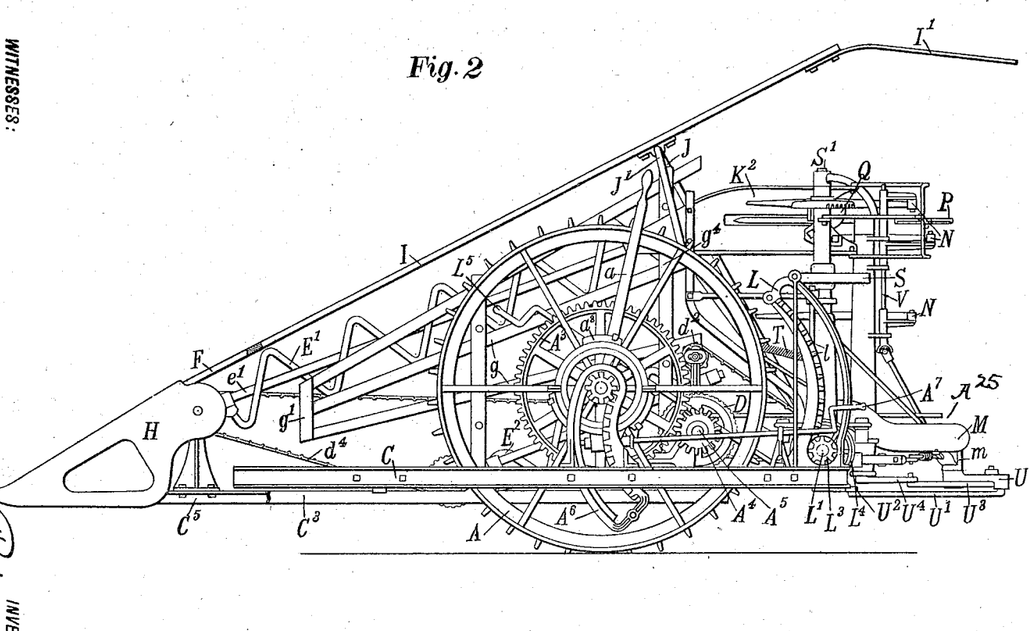
Fig. 2 is an elevation from the main-wheel side of the machine, the seat and draft devices not being shown.
Figure 3:
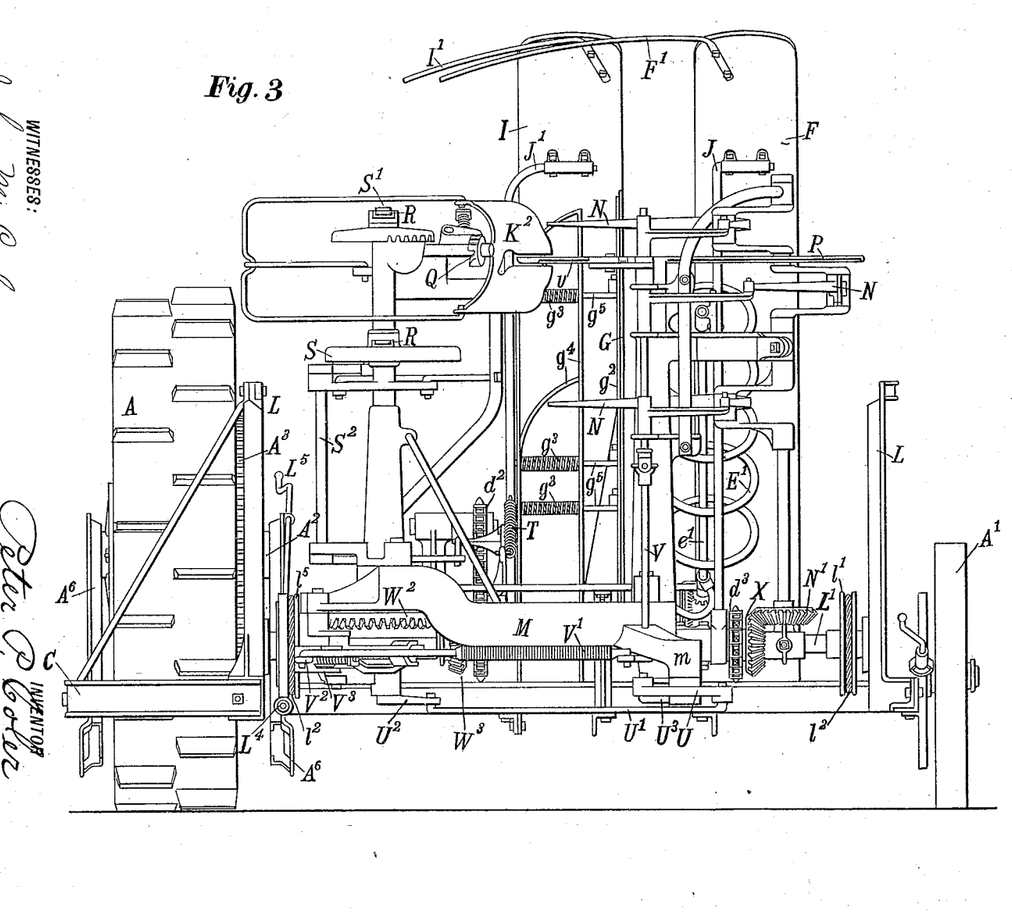
Fig. 3 is an elevation from the rear of the machine.

In the form of the binder shown the trip-shaft V acts as a compressor-shaft. The crank upon the end of this shaft is connected by a spring connecting rod V' with a trip-stop $V^2$, that is pivoted to the rock-lever $V^3$, that is in turn pivoted to a fixed portion of the binder-frame. This rock-lever $V^3$ carries upon one end a roller that travels on a cam $v'$, that is fixed to the knotter-shaft. A trip-dog W is pivoted to the cam $v'$ and at one end comes in contact with a series of ratchets W' on the bevel-wheel $W^2$. A constantly-rotating bevel pinion and sprocket $W^3$ is mounted on the horizontal stud L', and the pinion meshes with the wheel $W^2$. The bevel pinion and sprocket $W^3$ receives its motion by means of the chain $d^2$ from the main shaft $A^5$ of the machine. The trip-stop $V^2$ when the binder is open to receive a bundle is in the path of the trip-dog W and the parts are out of engagement. When, however, sufficient corn has been carried into the binding-receptacle by the packers N to force back the trip-fingers $v$ on the trip-shaft V, the trip-stop $V^2$ is carried from the face of the trip-dog W, and a spring upon the trip-dog (the usual arrangement of such parts) throws the trip-dog into the path of the ratchets $W'$ and the binding mechanism will start into action. On the other side of the machine, as more clearly shown in Figs. 3 and 5, a chain $d^3$ extends from the main shaft $A^5$ of the machine to the sprocket-wheel and bevel-pinion X, which gives motion through a bevel-wheel $N'$ to the shaft that carries the packers N.

The drawings and descriptions illustrate the means of carrying out my invention, the principal feature of which is the adjustable binder adapted to be raised and lowered bodily along the bundle, so as to place the band in a central position. The adjustment of the binder bodily allows the use of short needle and knotter shafts and makes the upright members of the U-shaped binder-frame require less strength. As the horizontal member is adjusted with the binder, and as this horizontal member is curved so that the bundle can form in this curved portion, when the adjustment is such as to raise the curved portion above the floor a means is shown of rocking this binder on its pivots, so that the curved horizontal member can be thrown downwardly and inwardly toward the table on which the bundle has been accumulating, at which time the ejectors discharge the bundle with greater ease, because the weight of the bundle helps, the binder being thrown toward a horizontal position. It is in these features that my invention primarily consists, and the constructions shown are only a means of carrying out the operation of my devices.

Another part of my improvement relates to the mechanisms for clutching and unclutching the main wheel with the devices which I have heretofore described. The main wheel A supports the larger part of the weight of the machine, and the driver who operates the machine and team is positioned on the outer side of the frame, so that his weight is upon the main wheel, thus giving it traction to move the devices that act upon the corn. This wheel is mounted in the bridles $A^6$ $A^6$, and its position in the frame is varied by the crank $A^7$. The main wheel turns freely upon the axle $A^2$ and at its inner side is positioned a spur-wheel $A^3$, that meshes with spur-pinion $A^4$. The spur-wheel $A^3$ has on the face which is against the main wheel A a flange provided with ratchets $a$. Upon the main wheel pivoted dogs $a'$ are positioned on studs, which dogs pass through slots in the main wheel and into the path of the ratchets $a$. A collar $a^2$ is fitted on the hub of the main wheel A so as to slide freely in and out and is provided with projecting beveled arms $a^3$, which are located in the path of rollers on the outer end of the pivoted dogs $a'$. When the collar $a^2$ is moved in on the hub of the main wheel, it rocks the dogs $a'$ on their pivots, so that their ends which project into the path of the ratchets $a$ are moved out of the path of the ratchets. Springs $a^4$ throw the dogs into the path of the ratchets when the collar $a^2$ is slid back. A convenient method of moving this collar is to loosely pivot on the end of the hub of the main wheel A against the end of the collar and connected therewith by a groove and flange $a^2$ a handle $a^5$. This handle has extending radially from the part which is pivoted to the hub arms $a^6$, that are provided with hooks $a^7$, which take over flanges $a^8$, that have diagonal trends and are connected with the device that adjusts the wheel in the frame. The adjusting device for raising and lowering the frame of the machine from the main wheel is built in accordance with the patent of H. E. Pridmore, granted August 29, 1893, No. 504,089. The operator, therefore, by grasping the handle $a^5$ and throwing it back and forth will because of the diagonal trend of the flanges $a^8$ force the collar $a^2$ in and out on the hub of the main wheel. This movement acts upon the dogs $a'$ to unclutch the machine, and the spring, as before stated, will throw the dogs into the path of the ratchets, thus clutching the parts.

The method of giving motion to the knife and the knife itself is the same as in the corn-binders of the McCormick manufacture regularly in the market.

Having now described my invention, what I desire to claim and secure by Letters Patent is—

1. In a self-binding corn-harvester, the combination of mechanism for gathering and cutting the corn in vertical position, a vertically-arranged and vertically-adjustable binder having a curved frame member extending across the path of the corn and forming when in its upper position a recess or cradle to receive the corn, and mechanism for conducting the corn standing on end to the binder and into the recess formed by the curved transverse frame member.

2. In a self-binding corn-harvester, the combination of a passage-way through which the corn is conducted standing on end, a stationary flooring on which the corn stands on end and is supported while being bound, a binder comprising vertically-arranged parallel members on opposite sides of said passage-way, and a transverse member forming when in its upper position a recess or cradle for the lower part of the bundle, and mechanism for adjusting binder lengthwise the corn.

3. In a self-binding corn-harvester, the combination of a passage-way through which the corn is conducted standing on end, a flooring on which it stands and is supported while being bound, a binder comprising vertically-arranged parallel members on either side of said passage-way and a transverse member crossing said passage-way, and mechanism for adjusting the binder toward and from the flooring lengthwise the corn so as to set it above or below the flooring.

4. In a self-binding corn-harvester, the combination of a passage-way through which the corn is conducted standing on end, a vertically-adjustable binder comprising parallel members on either side of said passage-way, said parallel members being connected together by a transverse member that extends when in its elevated position across the passage-way and against which the bundle forms, and said parallel members being of a length less than the distance from the butt-ends of the corn to the place where the band is applied.

5. In a self-binding corn-harvester, the combination of a passage-way through which the corn is conducted standing on end, a vertically-arranged binder, and mechanism for tilting the binder rearwardly with respect to the flooring under the binder to facilitate the discharge of the bound bundle.

6. In a self-binding corn-harvester, the combination of a passage-way through which the corn is conducted standing on end, a vertically-arranged binder, mechanism for adjusting the binder lengthwise the corn, and mechanism for tilting the binder rearwardly with respect to the flooring under the binder to facilitate the discharge of the bound bundle in the various adjustments of the binder.

7. In a self-binding corn-harvester, the combination of a passage-way through which the corn is conducted standing on end, a binder mounted on pivots at its lower end and comprising vertically-arranged parallel members on either side of said passage-way and a transverse connecting member curving rearwardly and extending across said passage-way, and mechanism for tilting the binder over backward on its pivots to get the transverse member out of the way of the bundle.

8. In a self-binding corn-harvester, the combination of a passage-way through which the corn is conducted standing on end, a flooring on which it stands and is supported while being bound, a binder comprising vertically-arranged parallel members on either side of said passage-way and a transverse connecting member that is rearwardly curved and forms when in its upper position an obstruction to the passage of the bundle, and mechanism for tilting the binder over backwardly to facilitate adjusting the bundle.

9. In a self-binding corn-harvester, adapted to bind the corn standing on end, the combination of a flooring on which the corn is conducted in vertical position from the cutter, a vertically-arranged binder adapted to bind the corn while standing on said flooring, said binder comprising a receptacle for the accumulation of the bundle, means for adjusting the binder lengthwise the corn, said binder being mounted on pivots at its lower end, and means for tilting the binder over backward on its pivots toward a horizontal position during the discharge of the bundle.

10. In a self-binding corn-harvester, adapted to bind corn of varying lengths while standing on end, the combination of a binder arranged in a substantially vertical position, and being mounted on pivots at its lower end, and means whereby said binder can be rocked on its pivots during the binding operation.

11. In a self-binding corn-harvester, the combination of forwardly-projecting gathering-prongs adapted to lift, sustain and direct the corn to the binder, forwarding devices to conduct the corn rearwardly, a vertically-arranged adjustable binder, and a connection between the rear ends of the gathering-prongs and the binder whereby when the latter is adjusted the prongs are also adjusted.

12. In a self-binding corn-harvester, the combination of forwardly-projecting prongs adapted to lift, sustain and direct the corn to the binder, forwarding devices carried by the prongs for conducting the corn to the binder, a vertically-arranged and adjustable binder, and a sliding connection between the said binder and the shaft of the forwarding devices.

13. In a self-binding corn-harvester, the combination of a traction-wheel, a spur-wheel, loosely mounted upon the main axle and fitted with ratchets, dogs pivoted on the traction-wheel, which extend into the path of the ratchets on the spur-wheel, a collar on the main axle having beveled projections, a shipping-handle attached to the collar and connected with a track which is fastened to the machine to prevent its rotation, and which has inclined sections, substantially as and for the purpose specified.

14. In a self-binding corn-harvester, the combination of a traction-wheel adapted to support the frame of the machine at different heights on an axle, a spur-wheel loosely mounted on the same axle and facing one face of the traction-wheel, pivoted spring-pressed dogs bolted to the traction-wheel and extended into the path of the ratchets, a collar having beveled projections mounted on the axle and adapted to be slid back and forth beneath the dogs to lift them from engagement with the ratchets, a handle mounted on the axle and connected with the collar, a track mounted on the axle having stretches at an angle to its main portion and connected with the frame of the machine to prevent its rotation, the handle having a sliding connection with the track, whereby the throwing of the handle causes the collar to be slid back and forth on the main axle, thus unclutching the machine.

PETER P. COLER.

Witnesses:
CHAS. E. CURTISS,
BERT R. BENJAMIN.